United States Patent [19]

Kolbeck et al.

[11] Patent Number: 5,049,397

[45] Date of Patent: Sep. 17, 1991

[54] DEGRADATION PRODUCT OF TOTAL PROTEIN

[75] Inventors: Winfried Kolbeck; Heinz Pyttlik; Maruta Grasis, all of Munich, Fed. Rep. of Germany

[73] Assignee: Diamalt Aktiengesellschaft, Munich, Fed. Rep. of Germany

[21] Appl. No.: 291,079

[22] PCT Filed: Apr. 13, 1988

[86] PCT No.: PCT/DE88/00230

§ 371 Date: Dec. 14, 1988

§ 102(e) Date: Dec. 14, 1988

[87] PCT Pub. No.: WO88/07822

PCT Pub. Date: Oct. 20, 1988

[30] Foreign Application Priority Data

Apr. 15, 1987 [DE] Fed. Rep. of Germany ....... 3712825

[51] Int. Cl.$^5$ ............................................... A23K 1/00
[52] U.S. Cl. ........................................ 426/7; 426/533; 426/623; 426/626; 426/630; 426/650; 426/656; 426/657; 426/807; 204/182.6
[58] Field of Search ................... 426/626, 623, 7, 630, 426/656, 657, 534, 533, 55, 56, 805, 807, 650; 204/182.6

[56] References Cited

U.S. PATENT DOCUMENTS

| 3,051,640 | 8/1962 | Traxler | 204/182.6 |
| 3,231,485 | 1/1966 | Kuwata et al. | 204/182.6 |
| 3,330,749 | 7/1967 | Kuwata et al. | 204/182.6 |
| 3,928,630 | 12/1975 | Perini | 426/7 |
| 4,427,658 | 1/1984 | Maubois et al. | 426/7 |
| 4,853,231 | 8/1989 | Osajima et al. | 426/7 |
| 4,908,220 | 3/1990 | Shih et al. | 426/657 |

FOREIGN PATENT DOCUMENTS

| 0087769 | 9/1983 | European Pat. Off. . |
| 0235908 | 9/1987 | European Pat. Off. . |
| 1518068 | 11/1970 | Fed. Rep. of Germany . |
| 2399213 | 3/1979 | France . |
| 0146002 | 1/1981 | German Democratic Rep. ................................. 426/533 |
| 7102385 | 1/1971 | Japan ................................. 426/533 |

OTHER PUBLICATIONS

G. Zaghini et al., "Addition of Amino Acids and Oligopeptides to Piglet Diets, I. Effects on Growth Performance and on the Development of Intestinal Flora", Chem. Ab., Band 92, Nr. 23 (Jun. 1980).

J. Solms et al., "Taste of Amino Acids, Peptides, and Proteins", Chem. Ab., Band 72, Nr. 19, 11 (May 1970).

L. E. Tsupak et al., "Casein Hydrolyzate", Chem. Abs. Band 93, Nr. 13 (sep. 1980).

Primary Examiner—R. B. Penland
Attorney, Agent, or Firm—Millen, White & Zelano

[57] ABSTRACT

The invention relates to a mineral salt-free total protein degradation product whose production and use is as a meat flavor precursor and protein source especially in animal feed. By mineral acid hydrolysis, a protein material, preferably from keratin, is obtained with subsequent electrolytic neutralization and reduction.

20 Claims, No Drawings

DEGRADATION PRODUCT OF TOTAL PROTEIN

The invention relates to a degradation product of total protein that is free of mineral salt, the process for its production and its use as a meat flavor precursor and protein source, especially in animal feed.

The significance of protein matter and its elements, the amino acids, for nutrition and medicine is generally known. But much of natural protein matter is not utilizable since it cannot be digested and is thus unsuited for nutritional purposes. Thus an economical conversion of protein matter of any kind into its amino acid and oligopeptide components is of the greatest interest.

It is known how to convert protein matter hydrolytically or enzymatically into digestible degradation products. Thus, for example keratin proteins, such as chicken feathers, horn or bristles as well as all the protein compounds of entire animal cadavers, by the effect of water or steam at high pressures and temperatures can for the most part be degraded into digestible peptides. Even "toasting" (=treating with superheated steam) of soybean proteins serves to make indigestible constituents of the soybean protein usable for animal feed.

The drawback here is that degradation occurs nonspecifically and certain thermolabile, essential amino acids such as methionine and cystine are destroyed. While, for example, untreated chicken feathers have a cystine content of 6-7%, "toasted" chicken meal contains only about 1% cystine.

Although the enzymatic method of protein degradation leads, under special conditions, partially up to the amino acids, it is limited to soluble protein matter, such as casein, gelatin, or the like, that are at least largely soluble at the necessarily neutral pH values. Insoluble proteins such as keratin cannot be converted in this way directly into utilizable protein degradation products.

Finally, it is known to hyrolyze any kind of protein by mineral acids and to neutralize the hydrolyzate subsequently by neutralization means, such as sodium hydroxide solution, soda, and the like. Previously such products have been used, for example, as food seasonings, or individual amino acids were isolated from them by methods known in the art such as crystallization or specific precipitation. Amino acids such as glutamic acid, tyrosine, arginine, leucine and cystine are produced in this way.

The drawback in this process is on the one hand the formation of humin, which leads to dark, colloidal solutions that require not only very large amounts of expensive activated carbon for bleaching but that are also responsible for losses in the yield of the amino acids to be isolated.

Another, at least as great a drawback of such hydrolyzates is the high content of inorganic salts that unavoidably precipitate during neutralization. Except for the production of food spices, in which about a 25% common salt content is desired, the salt content requires another purification operation and prohibits further use of hydrolyzate, which itself is of biologically very high quality.

A possibility of reaching a salt-free protein hydrolyzate consists in neutralizing the solution precipitating after the acid hydrolysis by ion exchange chromatography. But this process has the serious drawback that, during the neutralization process, amino acids such as mainly cystine and tyrosine already precipitate and can be fed again to the total hydrolyzate only by complicated, additional process steps. Also, less slightly soluble amino acids remain absorbed on the ion exchange resin and can be isolated again only by economically uninteresting amounts of solvent.

The process of electrolytic neutralization has previously been used only in isolating individual amino acids. Thus DT-PS 1 518 068 describes the production of individual, free amino acids from their acid addition salts by electrolysis using a diaphragm.

But for various reasons it was not to be expected that electrolytic neutralization could be used on a strongly mineral acidic, complex mixture of different amino acids and oligopeptides. Because of the excess mineral acid, here the electrolysis must act over a considerably longer period. Considering the process for a very sensitive amino acid, for example, such as cystine or cysteine, at a concentration of about 10% of this amino acid, relative to the entire solid protein degradation product, at least ten times the molar hydrogen-ion concentration must be discharged by the cathode stream if, in the most favorable, theoretical case, the amino acid/mineral acid ratio is 1:1. In practice, the amino acid/mineral acid ratio is always higher than 1:1.

It has now been found that a largely neutral mineral salt-free degradation product of total protein consisting of 1-99% by weight of a mixture of the amino acids from which natural protein matter is built can be obtained if, after mineral acid hydrolysis of a protein material, the hydrolyzate is subjected to an electrolytic neutralization and reduction using a diaphragm and the electrolyzate is then optionally concentrated by evaporation. The protein degradation product can contain up to 99% by weight of oligopeptides, but preferably it consists of at least 60% by weight, in particular at least 70% by weight of amino acids. A preferred protein material is keratin.

Since it is known that mixtures, even of the purest amino acids, change by condensing or decomposing, in contrast to the pure individual compounds in anhydrous storage, it was to be expected that such untreated mixtures of amino acids, oligopeptides and humins, as they are obtained after mineral acid degradation, change for the worse and become unusable products under the reaction conditions of electrolysis. Even the feasibility of electrolysis was doubtful, since by impurities as well as by matter contained in the product, blocking and clogging of cathode material and/or diaphragm material was to be expected. If, for example, the electrolytic neutralization of a slightly soluble, pure amino acid hydrochloride, such as leucine hydrochloride, is performed, then only about 6% cathode concentrations are possible. Otherwise, the leucine precipitating during the electrolysis blocks the cathodes and the current conduction is ended all too soon. But with such a low cathode concentration the process is no longer economical, since the electrolysis period becomes too long.

It is known that cystine can be electrolytically reduced into cysteine. But here also the purity of the starting material plays a large role. If improperly purified cystine from keratin is used, under electrolysis conditions a great blocking of the diaphragm pores occurs, making economical electrolysis impossible.

Also, in another way, the economic problem of electrolytic neutralization of protein hydrolyzates and individual amino acid hydrogen salts is completely different. Isolating individual amino acids from their pure, acidic salts involves mainly expensive substances in which energy expenditure and equipment wear, compared, for example, with substance loss, are of secondary importance. Thus here single batches can be worked with and the loss of destroyed carbon anodes can be accepted.

In contrast, with the protein degradation products according to the invention, economical producibility plays an essential role. The process for the production of the products according to the invention can be performed usefully only in a continuous processing method. But in such units the parts subject to wear must be minimally maintained. The preservation of carbon anodes in a continuous unit, combined with an energy-saving, low anode concentration, is thus a decisive condition for the process according to the invention.

Further, it is surprising that during electrolysis of the protein hydrolyzate, the solution that is greatly darkened by humin matter is strikingly bleached. In this way, obviously negative contamination effects on the electrolysis process are prevented. An expensive activated carbon treatment can be eliminated in most cases. Aside from the direct expense advantages of dispensing with the carbon, this effect is additionally decisive for the especially great capacity of the individual components to be isolated.

A likewise essential feature of the products according to the invention is that they are completely free of foreign matter, such as for example inorganic salts, that result from conventional processes during neutralization. With the exception of the mineral acid anions that are bonded to the basic amino acids, the products according to the invention contain only the biological components of the starting proteins.

Thus largely neutral and already very pure protein degradation products result that are outstandingly suited for solving problems of protein requirements for nutrition, medicine and cosmetics. Of special significance here may be that this also applies to protein matter that previously was considered as only poorly usable or unusable. It is further significant that the purity of the products according to the invention plays an essential role for the capacity to isolate individual amino acids from the mixture.

It is known that the presence of, for example, common salt, increases the solubility of individual amino acids and thus makes isolation more difficult. But similar action is also known for the presence of accompanying amino acids. But surprisingly, from the product according to the invention—evidently caused by its process-specific purity—individual amino acids can be isolated in yields not previously known.

Thus it becomes possible to isolate glutamic acid, leucine and/or tyrosine with considerably higher yields from spent mash or grain gluten. Especially significant is that the portion of cystine that can be isolated from keratin protein, besides other amino acids, glutamic acid, leucine and tyrosine, can also be considerably increased. Yields are achieved that are between one and a half times and three times the previously known amounts. The especially advantageous isolation of cystine is all the more surprising since even during the electrolysis process the sulfur amino acid, present originally as cystine, is first reduced to cysteine.

But because of the process-specific purity of the product it is possible, by measured oxidation, then to convert cysteine quantitatively into cystine and to isolate it in an outstanding yield. Since tyrosine can also be separated before the oxidation by air in good yields and great purity, the normally expensive separation of the two slightly soluble amino acids cystine and tyrosine is eliminated.

Another, economically especially advantageous factor is that the residue mixtures remaining after isolation of individual amino acids are so pure is essential amino acids and physiologically harmless that they can, for example, be used as high-grade protein feed. Since the isolation of individual amino acids is always performed advantageously from proteins that are especially rich in these amino acids, despite high yields of these amino acids, either enough remains behind or the just necessary amount is fed back to obtain a high-grade protein nutrition product.

The products according to the invention are outstandingly suited also in their entirety for adding purification steps depending on the application. Such purification steps are, for example, activated carbon absorption, normal and electrodialysis, molecular filtration, ion-exchange chromatography, and the like. Thus, for example, by combining activated carbon absorption and molecular filtration, mixture-defined amino acids can be produced that are practically free of peptides. Especially characterizing and surprising is the fact that such mixtures, because of their purity, are practically no longer hygroscopic after drying. The circumstance that the protein hydrolyzates obtained according to the prior art are strongly hygroscopic represents a known problem whose solution has already been sought in admixing a starch hydrolyzate to the protein hydrolyzate (DT-AS 1 937 687). The invention offers a very economical method of producing such highly pure, nonhygroscopic mixtures that suffice for the purity requirements of cosmetics, medicine and dietetics.

All protein matter that can be used for extracting individal amino acids or a defined, high-grade mixture is suited for the process according to the invention. Such protein matter is, for example, wheat and corn gluten, spent mash, hog bristles, human hair, chicken feathers, claws and horn, casein, soybean protein, and the like.

As degradation acids for the mineral acid hydrolysis, mineral acids are suited whose anions can penetrate with sufficient selectivity a suitable separating membrane relative to amino acids. Hydrochloric acid is preferably used since, after the breakdown before the electrolytic neutralization, it can be reduced by vacuum evaporation in the theoretically best case to the portion that corresponds to the content of free amino acids and oligopeptides that is capable of salt formation.

The protein hydrolyzate that is subjected to electrolytic neutralization generally has a pH of less than 0 to 1.5, preferably 0 to 0.5.

Electrolytic neutralization is generally performed at a temperature of 10°–60° C., preferably 20°–60° C. A current density of 0.005–0.3, preferably 0.01–0.2 A/cm$^2$ is suitable. The electric potential is generally 4–40, preferably 6–30 volts.

Preferably the highly acidic hydrolysis product is placed in the cathode compartment of an electrolysis device that contains a cathode of mercury, copper, lead, iron or tin and exhibits an anode of carbon, platinum or other oxidation-resistant materials, as well as a diaphragm between the anode compartment and the cathode compartment. Suited as diaphragms are those that let the anions pass out of the cathode compartment, suitably a membrane, in particular a clay membrane, with a pore size of 0.5–10 microns. As an anolyte, a 1–30% by weight, preferably 2–16% by weight solution of the mineral acid is used that is used for hydrolytic degradation. It is essential that the anolyte flow by the anode, preferably carbon anode, with low mineral acid concentration in the flow. The original starting concentration can again be set in the receptacle. This guarantees that the neutralization occurs quickly and economically. If a standing anolyte or one with too low a flow is used, with anolytes with low mineral acid concentrations, the graphite anodes are very quickly destroyed. At higher anolyte concentrations, for example greater than 16% by weight, the anodes are indeed not destroyed, but energy consumption is then about twice as high as with the use of low mineral acid concentrations.

The concentration of the protein degradation product for electrolysis is 10-80% by weight, preferably 30-50% by weight. The electrolysis process can be performed batchwise discontinuously and continuously in several consecutive electrolysis cells, and it is preferred that the anolyte—especially when using carbon anodes—flows continuously in the way described above and is optionally regenerated.

The use of a semipermeable membrane has proven especially favorable.

Preferably, the electrolysis is performed at a pH of 0.5-4.5, in particular 1.5-2.0.

An interesting variant of the process according to the invention consists in converting the protein material, in particular the keratin material, first with mineral acid into peptide degradation products and performing the further breakdown into the amino acids enzymatically after electrolytic neutralization. For this purpose, the keratin is carefully dissolved in aqueous mineral acid at, for example 50°-60° C., the mineral acid excess is evaporated in a vacuum and electrolyzed as described. After neutralization, peptides can be isolated by precipitation, molecular filtration or chromatography or can be degraded into the amino acids by enzymes, for example bacterioproteases or papain.

An especially advantageous use of the protein degradation products according to the invention, especially those of keratin, is their use as meat flavor precursors.

It is known to produce meat flavors by condensing flavor precursor systems of the meat under specific conditions.

Previously known as such precursors were: amino acids, monosaccharides (hexoses, such as glucose and fructose or pentoses such as ribose, xylose and arabinose), ribonucleotides such as inosinic acid and guanosinic acid, ascorbic acid and thiamine hydrochloride.

All of these condensation systems leading to high-quality meat flavor have in common as the key substance the amino acid cysteine. This amino acid was previously applied and used as a pure substance. The costs for the production of this natural product are high and thus make the costs for meat flavor production increase so that this pure substance was able to be used only for very special purposes of high quality requirements in artificial meat flavors.

Since evidently the hydrogen sulfide released from the cysteine is decisive for the production of meat flavor, it has been tried to replace cysteine by hydrogen sulfide directly in flavor production. But this leads to a qualitatively inferior meat flavor. Such preparations have not taken hold up to now.

Now the protein degradation products according to the invention preferred as meat flavor precursor contain, on the one hand, cysteine in a concentration of 2-20% and on the other hand, also other amino acids necessary for the production of flavor. It was found that by the combination according to the invention of hydrolysis and electrolysis of cystine-containing, natural protein matter a neutral, high-quality, very pure mixture of L-cysteine and other amino acids can be produced that is suitable for extracting an excellent and inexpensive meat flavor.

As suitable, cystine-rich starting materials, animal protein matter, especially keratins, are suited, such as hair, horns, feathers, wool, and the like or also plant protein matter such as wheat gluten, the protein of the dika nut (Irvingia gabonensis) or the desert date (Balanites aegyptiaca). Animal protein matter is especially suited as starting material since its composition is similar to that of the meat.

The extraction of a cysteine-containing protein degradation product that is especially suited for meat flavor production according to the process according to the invention is surprising because, with electrolysis of a protein hydrolyzate it was rather to be expected that byproducts would result that stand in the way of using the protein degradation product as a flavor precursor. This is especially true in the case of electrolytic neutralization.

But with the process according to the invention there results a very pure, light-colored and neutral protein degradation product. This already very pure hydrolyzate can especially easily and economically be subjected to other purification steps such as, for example, carbon absorption, extraction or dialysis for releasing the pure amino acids from peptide residue fragments.

For the production of the final meat flavor, such an amino acid precursor product is reacted with condensable "Maillard systems" known in the art. Suitable for this is reaction with pentoses, hexoses, ascorbic acid, ribonucleotides, yeast extracts and the like.

The protein degradation product according to the invention can be used especially advantageously, besides as meat flavor, also as a protein source in animal feed, as fertilizer additive and as culture medium components for fermentation purposes.

EXAMPLE 1

500 g of chicken feathers is dissolved in 1 liter of hydrochloric acid (26%) and hydrolyzed for 10 hours at 108° C. The excess hydrochloric acid is evaporated in a vacuum and the residue is again absorbed with water up to a solid concentration of 40%. Filtering off from the precipitated humin matter is performed using diatomaceous earth as a filter agent. A solution with a pH of 0.3 and a chloride content of 10% is obtained as filtrate.

A round copper cathode is placed in a 3 liter beaker and a clay cylinder closed on the bottom is put in. A graphite rod is fastened in the clay cylinder as the anode. The cathode compartment is filled with the hydrolyzate. 5% hydrochloric acid is allowed to flow through the anode compartment from the bottom upward so that at 3.6 times per hour an exchange occurs. At the same level as the catholyte, the anolyte is withdrawn. With this process method there is no destruction of the anode graphite. Electrolysis is performed for 44 hours with 12 A and 4 V (4224 Wh/kg=0.48 kWh/mol, and 120 as an average molecular weight was calculated in the keratin protein).

The hydrolyzate has a pH of 4.5 and is honey-yellow. After limited carbonization with 5 g of carboraffin, the product is concentrated into a light-colored paste with 80% solid content. The solid consists at least 70% of pure amino acids in weighed balance. The residue is oligopeptides and other components of the original protein matter. Since these amino acids can be reabsorbed immediately, the paste is outstandingly suited as an especially protein-rich feed additive.

EXAMPLE 2

600 kg of crushed horns is hydrolyzed in 2000 liters of hydrochloric acid (26%) as in example 1. After evaporation of the hydrochloric acid, absorption with water and filtering of the humin matter, a 40% solution with a pH of 0.3 is obtained.

This solution is permitted to pass through a ten-cell continuous unit, as it is described, for example, in DE-OS 16 43 285.2. To protect the graphite anodes, 30% hydrochloric acid is recycled until a concentration of 16% is established. With 500 A and 30 kWh, up to a pH of 4.5 a flow rate of 3.5 liters/hour is achieved. The keratin content was 225 g/liter. This means energy consumption of 8.84 kWh/kg of keratin.

If the same solution with 8% anolyte is permitted to pass through the unit, the increase in flow rate and energy consumption amounts to only 4.23 kWh/kg of keratin. Here the anolyte flows with a quintuple exchange per hour by the anodes and is suctioned off above at the same level as the catholyte.

A honey-yellow solution with pH 4.5 and a 30° refraction results.

Spray-drying with 1.5% Aerosil results in a light-colored powder consisting at least 75% of pure amino acids in balance. Yield: 500 kg.

EXAMPLE 3

500 g of hair is dissolved in 3 liters of hydrochloric acid (26%) and hydrolyzed for 10 hours. The excess hydrochloric acid is evaporated in a vacuum and the residue is absorbed with water until a 40° refraction. Electrolytic working up is performed like in example 1.

During electrolysis a precipitate is formed in the honey-yellow solution that increases by crystallization. It consists essentially of tyrosine. The bright yellow product is suctioned off and is used for isolating the amino acid tyrosine according to the usual methods.

Tyrosine yield: 3.9 g $\triangle$ 0.78% = 39% of the originally present tyrosine (2.0%).

The filtrate is treated with 5 g of carboraffin and filtered. A yellow solution results. By blowing in air and by crystallization at room temperature with stirring, L-cystine is extracted from this.

Yield: 65 g $\triangle$ 13% relative to hair or 86% relative to analytically determined cystine (15.1%).

Analysis: $\alpha(D/20) = -219.5$

Content: 99.0%

The mother liquor (refraction 38) is set at pH 3.0 with 125 ml of 30% hydrochloric acid. After addition of glutamic acid-seed crystals, it is left for 8 days at room temperature to crystallize. Suctioning off and washing yielded 35 g of L-glutamic acid = 7% relative to keratin or 65% relative to the glutamic acid present (13%).

Repeated electrolytic neutralization of the mother liquor until pH 6 with 190 Ah at 4 V yields a mixture consisting essentially of L-amino acids that can be converted by spray drying into a beige-colored product.

Yield: 350 g.

Because of its amino acid composition, this product is preferably suited as a feed or fertilizer additive or as culture media components for fermentation purposes.

EXAMPLE 4

2 liters of spent mash is mixed with the same liter amount of 30% hydrochloric acid and hydrolyzed for 12 hours. It is filtered off from the insoluble humins with 10 g of diatomaceous earth. The excess hydrochloric acid is evaporated and the residue is absorbed with water until a 45° refraction. In the equipment described above, this solution is electrolytically neutralized according to example 1 on a lead cathode for 20 hours at 4 V and 10 A. A honey-yellow product with a pH of 3.0 results. After the addition of 5 g of carboraffin, filtering is performed and the filtrate is crystallized at 6° C. for six days.

15 g of glutamic acid with a degree of purity of already 96–99% results. The usual purification yields 11.8 g $\triangle$ 5.9% = 70% of the amount of glutamic acid present. The filtrate is again neutralized electrolytically to a pH of 4.5. At 60°, within 24 hours, 2 g of tyrosine crystallizes out with a degree of purity of 95%. Pure tyrosine yield: 1.5 g $\triangle$ 0.1%. Crystallization of the filtrate at 10° C. again for 24 hours yields 4 g of mainly L-leucine that can be converted by the usual purification into 2 g of pure leucine.

EXAMPLE 5

500 g of casein is hydrolyzed in 3 liters of 26% hydrochloric acid. According to the working up according to example 1, a honey-yellow electrolyzate results. After treatment with 10 g of carboraffin, the honey-yellow filtrate is poured on a 500 ultrafilter, $\phi$7 cm. Filtration (2 liters) at 25 bar lasts 4 hours. The nitrogen loss is 2.6%. By simple drying, e.g., in the vacuum cabinet, a colorless, practically no longer hygroscopic powder is obtained.

Yield: 420 g.

Analysis shows a free amino acid content of 98%. The product is outstandingly suited for dietetic, cosmetic and oral medicinal purposes.

EXAMPLE 6

500 g of hair is dissolved in 1.5 liters of hydrochloric acid (30%) at 50°–60° C. Excess hydrochloric acid is evaporated in a vacuum at a maximum of 60° C. The residue is again absorbed with water to a 40° refraction (Abbe refractometer). After carbonization and filtration, electrolysis is performed with cooling (max. 40° C.) on a Pb cathode to pH 4.5. 3.5 kWh/kg keratin is used. The solution obtained can easily be dried. 400 g of a beige-colored powder is obtained. As water-soluble, high molecular keratin peptides containing SH, they are outstandingly suited for use in hair cosmetics, for example for cross-linking purposes.

EXAMPLE 7

500 g of hog bristles is dissolved in 1.5 liters of hydrochloric acid at max. 60° C. and worked up according to example 6. The electrolyzate is treated at pH 6 and 37° C. for 2 days with commercial bacterioprotease. 42 g of L-cystine of the usual purity is obtained.

Yield: 8.4% = 78% of the analytically detected cystine amount.

EXAMPLE 8

500 g of hog bristles is dissolved in 3 liters of 26% hydrochloric acid and hydrolyzed for 10 hours. Excess hydrochloric acid is evaporated in a vacuum and the residue absorbed with water until 40° refraction (Abbe refractometer). After the addition of 5 g carboraffin filtering is performed. The hydrolyzate is electrolytically neutralized on a copper cathode and after 300 Ah (at 4–5 V) a pH of 4.9 is reached. Cystine has thus been quantitatively reduced to cysteine.

Cystine content before electrolysis according to Folin-Marensi: 25.4 mg/ml

Cysteine content after electrolysis (potentiometric SH titration with $HgCl_2$): 24.2 mg/ml The bright yellow solution is treated with 50 g of activated carbon and filtered. Drying the colorless solution yields 407.8 g = 81.2% of a nearly colorless product.

Cysteine content of the meat flavor precursor: 12%.

EXAMPLE 9

According to example 8, 500 g of crushed horns is hydrolyzed and worked up. 450 g of a beige-colored meat flavor precursor with a cysteine content of 7% results.

EXAMPLE 10

According to example 8, treated chicken feathers are hydrolyzed. 432 g of the honey-yellow meat flavor precursor contains 6.5% L-cysteine.

EXAMPLE 11

500 g of wheat gluten is dissolved in 1 liter of 30% hydrochloric acid and hydrolyzed for 10 hours at 108° C. After activated carbon clarification and filtration, the solution is neutralized with soda to pH 6. After 24 hours of crystallization, it is filtered off from the residue. The solution is permitted to mature for 4 days. Next it is electrolyzed with 10 A and 4 V on a copper electrode for 3 hours. The negligible amount of cystine present is reduced here to cysteine. (Cystine 2.5% relative to gluten used).

EXAMPLE 12

(Comparative Example)

3 g of L-cysteine, 30 g of hydrolyzed wheat gluten that was produced by normal neutralization with soda, 0.3 g of an inosinic and guanosinic acid mixture as well as 5 g of xylose is refluxed for 3 hours and kept for 10 hours at 70° C. After a 2-day maturing process and dry steaming, a product results that smelled in the known, good way of roast beef.

EXAMPLE 13

Like in example 11, 2.5 g of cysteine and 30 g of a hydrolyzed wheat gluten with electrolytic secondary treatment according to example 11, 0.3 g of inosinic acid and guanosinic acid as well as 5 g of xylose are worked up according to example 12. A meat flavor results that was judged by 5 testers to be better than the flavor produced according to example 12.

EXAMPLE 14

Of the meat flavor precursor produced according to example 8, 25 g is worked up with 5 g of xylose, 0.3 g of a mixture of inosinic and guanosinic acid according to example 12. The meat flavor resulting from this was again judged by 5 testers to be better than the flavor produced according to example 12.

EXAMPLE 15

46 g of a flavor precursor produced according to example 10 is refluxed with 5 g of ribose, 5 g of glucose and 0.1 g of inosinic and guanosinic acid for 3 hours and kept for 10 hours at 70° C. Two days of maturing and drying results in a product with the intense aroma of roast beef.

EXAMPLE 16

500 g of hog bristles is dissolved in 1.5 liters of hydrochloric acid (30%) and hydrolyzed for 10 hours at 108° C. Excess hydrochloric acid is evaporated in a vacuum and the residue is absorbed with water up to 40° refraction.

The residue in water is worked up electrolytically on a copper cathode to pH = 1.8, for which electrolysis is performed for 12 hours with 12 A and 4 V (1152 Wh/kg = 0.14 kWh/mol). During electrolysis, the solution becomes considerably lighter in color. At this pH, all amino acids present in keratin, even cystine and tyrosine, remain in solution.

After slight carbonization with 5 g of carboraffin, a honey-yellow solution results that consists of 25% pure amino acids in balance. This solution can be further processed directly in liquid form or after spray drying as a powder.

Yield: 420 g of a dry substance.

We claim:

1. A protein hydrolysate product substantially free of mineral salt, and produced by mineral acid hydrolysis of protein matter, consisting essentially of 1–99% by weight of a mixture of the amino acids from which the unhydrolyzed protein matter is made and 99–1 % by weight of incompletely hydrolyzed oligopeptides derived from the natural protein matter, which mixture of amino acids and oligopeptides is substantially free of mineral salt.

2. A protein hydrolysate product according to claim 1, wherein the amino acids include cysteine, and the cysteine content is 2–20%.

3. A protein hydrolysate product according to claim 1, wherein the natural protein matter hydrolyzed is keratin, wheat gluten or soybean protein.

4. In a method of producing a meat flavoring agent, comprising condensing a meat flavor precursor with a Maillard system, the improvement wherein the meat flavor precursor is a protein hydrolysate product of claim 1.

5. A method of claim 4, wherein the meat flavoring agent is used in animal feed.

6. In a method of producing animal feed, comprising a protein source, the improvement wherein the protein source is a protein hydrolysate product of claim 1.

7. A process for the production of a protein hydrolysate substantially free of mineral salt, and produced by mineral acid hydrolysis of protein matter, comprising electrolytically neutralizing and reducing the mineral acid hydrolysate of protein matter, wherein the electrolytic neutralization and reduction are performed in anode and cathode compartments containing an anolyte and a catholyte, respectively, which compartments are separated by a diaphragm, and optionally concentrating the electrolyzate by evaporation.

8. Process according to claim 7, wherein the mineral acid hydrolysis is performed with hydrochloric acid.

9. A process according to claim 8, wherein the mineral acid is substantially evaporated before electrolytic neutralization.

10. A process according to claim 7, wherein the electrolytic neutralization and reduction step is performed at a temperature of 10°–60° C. with a current density of 0.005–0.3 A/cm² and with an electric potential of 4–40 volts.

11. A process according to claim 10, wherein the electrolytic neutralization and reduction step is performed at a temperature of 20°–60° C., with a current density of 0.01–0.2 A/cm² and with an electric potential of 6–30 volts.

12. A process according to claim 7, wherein the electrolytic neutralization and reduction are performed at a substrate concentration of 10–80% by weight, relative to the weight of the mixture of amino acids and oligopeptides and with a low mineral acid concentration of 2–20% in the anode compartment.

13. A process according to claim 12, wherein the electrolytic neutralization and reduction are performed at a substrate concentration of 30–50% by weight, relative to the weight of the mixture of amino acids and oligopeptides and with a low mineral acid concentration of 4–10% in the anode compartment.

14. A process according to claim 7, wherein electrolytic neutralization and reduction are performed on cathodes of mercury, copper, lead, iron or tin and anodes of carbon, platinum or other oxidation-resistant materials.

15. A process according to claim 7, wherein during electrolytic neutralization and reduction, a membrane with a pore size of 0.5–10 microns is used as the diaphragm.

16. A process according to claim 7, wherein the anolyte is left to flow by the anode.

17. A process according to claim 7, wherein cysteine-containing proteins are used as the protein matter.

18. A process according to claim 17, wherein keratin, wheat gluten or soybean protein are used as cysteine-containing proteins.

19. A process according to claim 10, wherein electrolysis is performed at a pH of 0.5–4.5.

20. A process for the production of a protein hydrolysate substantially free of mineral salt, and produced by mineral acid hydrolysis of protein matter, wherein the mineral acid hydrolysis comprises dissolving the protein matter in an aqueous mineral acid, comprising
 electrolytically neutralizing and reducing the mineral acid hydrolysate of protein matter, wherein the electrolytic neutralization and reduction are performed in anode and cathode compartments containing an anolyte and a catholyte, respectively, which compartments are separated by a diaphragm,
 subjecting the electrolyzate to an enzymatic degradation, and,
 optionally, concentrating the electrolyzate by evaporation.

* * * * *